United States Patent
Davis et al.

(10) Patent No.: US 9,754,041 B2
(45) Date of Patent: Sep. 5, 2017

(54) METHOD OF AUTOMATICALLY CONSTRUCTING CONTENT FOR WEB SITES

(71) Applicant: Webfire, LLC, Verona, WI (US)

(72) Inventors: Nathan K. Davis, Rockland, ME (US); Brian Kosobucki, Verona, WI (US)

(73) Assignee: Webfire, LLC, Verona, WI (US)

( * ) Notice: Subject to any disclaimer, the term of this patent is extended or adjusted under 35 U.S.C. 154(b) by 91 days.

(21) Appl. No.: 14/639,649

(22) Filed: Mar. 5, 2015

(65) Prior Publication Data

US 2016/0154798 A1    Jun. 2, 2016

Related U.S. Application Data

(60) Provisional application No. 61/948,723, filed on Mar. 6, 2014.

(51) Int. Cl.
   G06F 17/00    (2006.01)
   G06F 17/30    (2006.01)

(52) U.S. Cl.
   CPC .... *G06F 17/3089* (2013.01); *G06F 17/30864* (2013.01)

(58) Field of Classification Search
   CPC ........... G06F 17/30684; G06F 17/2854; G06F 17/2705; G06F 17/28; G06F 17/271; G06F 17/274
   See application file for complete search history.

(56) References Cited

PUBLICATIONS

Arora et al. "Latent Dirichlet Allocation Based Multi-Document Summarization," Department of Computer Science and Engineering, Indian Institute of Technology Madras, Jul. 24, 2008, 7 pages.
Michal Campr et al. "Comparative Summarization via Latent Dirichlet Allocation," Department of Computer Science and Engineering, FAV, University of West Bohemia, Feb. 11, 2013, pp. 80-86.
Dehong Gao et al. "LDA-Based Topic Formation and Topic-Sentence Reinforcement for Graph-Based Multi-document Summarization," Department of Computing, The Hong Kong Polytechnic University, 2012, pp. 376-385.
Hennig, Leonhard, "Topic-based Mulit-Document Summarization with Probabilistic Latent Semantic Analysis," DAI Labor, TU Berlin, International Conference RANLP 2009, pp. 144-149.

*Primary Examiner* — Truong Vo
(74) *Attorney, Agent, or Firm* — Fogg Powers LLC

(57) ABSTRACT

Device implemented method and machine readable storage medium automatically generates content from a plurality of web sites into original content. Web sites are searched using a predetermined key word to create a subset of the plurality of web sites having web content related to the predetermined keyword. A corpus is created by separating the web content into a plurality of sentences, each of the plurality of sentences having a plurality of words. The sentences are filtered for suitability of use in automatically generating the generated content. A new sentence is instantiated by taking a first portion of a first one of the plurality of topics combined with a second portion of a second one of the plurality of topics and repeating until a number of new sentences are formed.

26 Claims, 8 Drawing Sheets

METHOD OF AUTOMATICALLY CONSTRUCTING CONTENT FOR WEB SITES

RELATED APPLICATION

This application claims priority from provisional U.S. Patent Application Ser. No. 61/948,723, filed Mar. 6, 2014.

FIELD

The present invention relates to methods, and storage media containing instructions for performing such methods, for interacting with web sites and, more particularly, to methods, and storage media containing instructions for performing such methods, for interacting with web sites involving the automatic construction of content.

BACKGROUND

The internet is broadly used in society today and is broadly used for commerce. Businesses rely on the internet, and on individual web sites on the internet, to conduct business which can range from information gathering and information delivery, e.g., business location, contact information and descriptions about the business, to electronic commerce in which businesses or individuals buy, sell and transfer merchandise and arrange over the internet for the delivery of services. Thus, not only is the internet widely used for non-commercial purposes, but also commercial use of the internet is widespread.

SUMMARY

In an embodiment, a device implemented method automatically generates content from a plurality of web sites into original content. A plurality of web sites are searched on the internet using a predetermined key word to create a subset of the plurality of web sites having web content related to the predetermined keyword. A corpus is created by separating the web content into a plurality of sentences, each of the plurality of sentences having a plurality of words. The plurality of sentences from the corpus are filtered for suitability of use in automatically generating the generated content by an analysis of at least one of (1) sentence grammar, (2) sentence form, (3) sentence punctuation, (4) sentence length, and (5) the plurality of words. A topic is determined, separately for each of the plurality of sentences using a topic model creating a plurality of topics. Each of the plurality of topics are ranked based upon a determination of uniqueness keeping a portion of the plurality of sentences with the topic having a relatively higher ranking and discarding those of the plurality of sentences with the topic having a relatively lower ranking. A new sentence is instantiated by taking a first portion of a first one of the plurality of topics combined with a second portion of a second one of the plurality of topics. Instantiating is repeated taking a different portion of a different one of the plurality of topics combined with another portion of the still another one of the plurality of topics until a number of new sentences are formed.

In an embodiment, the first portion of the first one of the plurality of sentences and the second portion of the second one of the plurality of sentences are selected by comparing the first one of the plurality of sentences with other sentences in the corpus. The first one of the plurality of sentences is picked based on a higher degree of relationship between the first one of the plurality of sentences and the second one of the plurality of sentences. Selection and picking are repeated for each new sentence in a paragraph.

In an embodiment, noun phrases in the plurality of sentences of the corpus are identified. Verb phrases in the plurality of sentences of the corpus are identified. A list of possible noun phrase—noun phrase pairs and verb phrase—verb phrase pairs are compiled by iterating through each of the noun phrases and the verb phrases of the plurality of sentences of the corpus. A noun phrase in one of the plurality of sentences is replaced with its corresponding noun phrase from a noun phrase—noun phrase pair determined in the compiling step. A verb phrase in one of the plurality of sentences is replaced with its corresponding verb phrase from each verb phrase—verb phrase pair determined in the compiling step creating the new sentence.

In an embodiment, only a portion of the web content is stored as the corpus.

In an embodiment, formatting and graphics are eliminated.

In an embodiment, portions of the corpus that includes a personal reference to the author are excluded.

In an embodiment, portions of the corpus which contains a reference to an antecedent including but not limited to "this" and "there".

In an embodiment, the topic is determined without regard to how each of plurality of sentences may relate to other of the plurality of sentences.

In an embodiment, the topic is determined using a latent dirichlet allocation topic model.

In an embodiment, the plurality of sentences from the corpus are filtered for suitability of use in automatically generating the generated content by an analysis of sentence grammar.

In an embodiment, only sentences having both a noun and a verb are selected.

In an embodiment, the plurality of sentences from the corpus are filtered for suitability of use in automatically generating the generated content by an analysis of sentence form.

In an embodiment, only sentences that contain less than a predetermined number of capitalized words are selected.

In an embodiment, only sentences that contain fewer than eleven capitalized words are selected.

In an embodiment, the plurality of sentences from the corpus are filtered for suitability of use in automatically generating the generated content by an analysis of sentence punctuation.

In an embodiment, only sentences without a comma within a predetermined number of its first characters are selected.

In an embodiment, only sentences without a comma within a first twenty characters of the sentence are selected.

In an embodiment, the plurality of sentences from the corpus are filtered for suitability of use in automatically generating the generated content by an analysis of sentence length.

In an embodiment, only sentences containing a predetermined range of length are selected.

In an embodiment, only sentences ranging from ten to thirty words in length are selected.

In an embodiment, the plurality of sentences from the corpus are filtered for suitability of use in automatically generating the generated content by an analysis of the plurality of words.

In an embodiment, only sentences that do not contain a predetermined list of prohibited strings of words are selected.

In an embodiment, the predetermined list of strings of words has a reference to another textual location.

In an embodiment, only sentences that do not contain a time of day are selected.

In an embodiment, only sentences containing less than six numerical digits are selected.

In an embodiment, machine readable storage medium stores executable program instructions which when executed cause a data processing system to perform a method for automatically generating content from a plurality of web sites into original content. A plurality of web sites are searched on the internet using a predetermined key word to create a subset of the plurality of web sites having web content related to the predetermined keyword. A corpus is created by separating the web content into a plurality of sentences, each of the plurality of sentences having a plurality of words. The plurality of sentences from the corpus are filtered for suitability of use in automatically generating the generated content by an analysis of at least one of (1) sentence grammar, (2) sentence form, (3) sentence punctuation, (4) sentence length, and (5) the plurality of words. A topic is determined, separately for each of the plurality of sentences using a topic model creating a plurality of topics. Each of the plurality of topics are ranked based upon a determination of uniqueness keeping a portion of the plurality of sentences with the topic having a relatively higher ranking and discarding those of the plurality of sentences with the topic having a relatively lower ranking. A new sentence is instantiated by taking a first portion of a first one of the plurality of topics combined with a second portion of a second one of the plurality of topics. Instantiating is repeated taking a different portion of a different one of the plurality of topics combined with another portion of the still another one of the plurality of topics until a number of new sentences are formed.

DRAWINGS

DESCRIPTION

The entire content of provisional U.S. Application Ser. No. 61/948,723, filed Mar. 6, 2014, is hereby incorporated by reference.

The description of automatically developing content for web sites, for example, commenting on web sites, is described by first examples of determining which web site or which web sites could, might or should be used for introducing comments. These examples are exemplary only and are not restrictive of the automatic development or creation of content for web sites.

A given web site with "in links" to the target web site from other web sites may receive a higher search ranking than comparable web sites that either do not have such "in links" or have fewer or less desirable "in links". One technique for creating such "in links" may be to leave comments on other web sites that may make reference to or have a link to the target web site. However, creating such comments manually is a time-consuming and arduous task.

Figure 1:
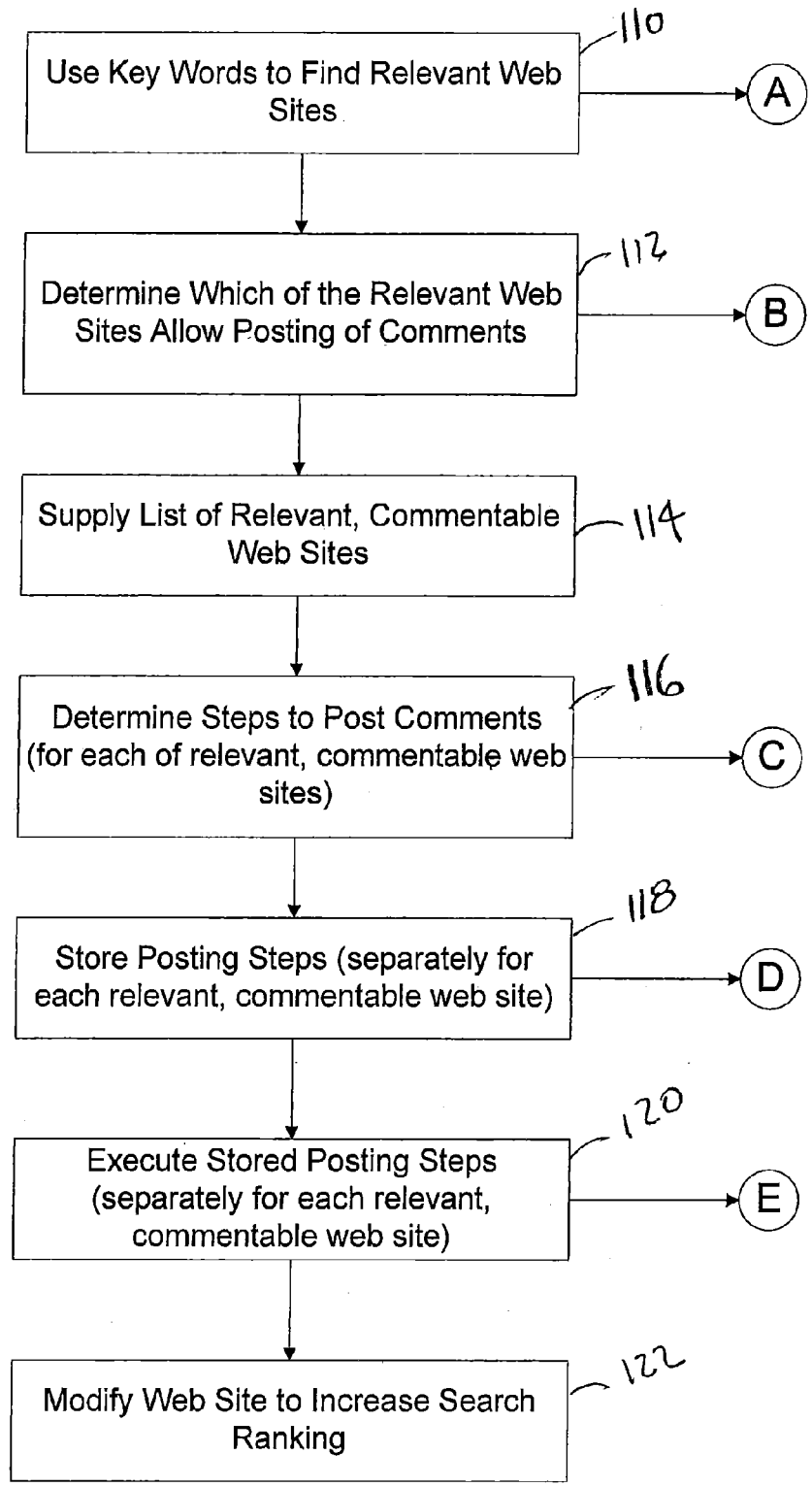
FIG. 1 is a flow chart illustrating a plurality of automated web tools for web sites.

An automated technique for interacting with a plurality of web sites is illustrated in the flow chart of FIG. 1. While the flow chart of FIG. 1 is illustrated, and described, in sequential detail, it is to be recognized and understand that it is not required that the flow chart be implemented in the sequence illustrated and described. Further, it is to be recognized and understood that not all of the steps or techniques illustrated and described need to be performed. One or more of the steps or techniques may be implemented to achieve a partial result without necessarily implementing all of the steps or techniques illustrated and described. It is not necessary to perform every step of FIG. 1, nor all of the steps or techniques illustrated and described with respect to the detailed flow charts in FIGS. 2 through 6.

A first step that may be performed is to find (110) relevant or more relevant web sites that are at least somewhat related to the target web site. A search term or terms may be submitted to a well known search engine. Some or all of the web sites returned from the search request may be used as a set of web sites that are considered relevant to the target web site. Alternatively, the web sites returned from the search request may be perused manually and the list of relevant web sites may be culled or restricted for a better relevant fit to the target web site.

Taking the list of relevant web sites, the list is further filtered by determining (112) which ones of the list of relevant web sites allow for the placement of comments. Each individual one of the web sites on the list of relevant web sites, or a culled list, is automatedly searched to determine whether visitors or users of the web site may leave comments on the web site.

Optionally, that list of relevant and commentable web sites may be presented (114) to a user. A user viewing or processing that list of relevant and commentable web sites may then manually, if the user chooses, either cull the list further based on other criteria or may exit the automated process and perform one or more of the following steps manually. In an embodiment, the list of relevant and commentable web sites is presented on a display, for example, in a web browser. In addition or alternatively, the list of relevant and commentable web sites may be supplied electronically, e.g., in a document such as a database, spreadsheet, word processing document or a PDF document.

For those relevant and commentable web sites, it may be determined (116) in particular what steps are performed in order to actually post comments on each such web site. It is expected that the steps involved may and probably will be different for many if not each of the relevant and commentable web sites. Once a set or sequence of steps is determined for a particular relevant and commentable web site, the set or sequence of steps may be stored (118) for future use. As an example, each relevant and commentable web site may be reviewed manually once in order to determine and record, as in recording a macro, the steps involved in actually placing a comment on the relevant and commentable web site. Alternatively, the process of determining (116) what steps are performed to post comments on a particular web site may be at least partially and perhaps fully through the use of web tools described later with respect to FIG. 4. The determining and storing steps are repeated for each individual one of the relevant and commentable web sites.

However obtained, once the set or sequence of steps to be performed to comment on each relevant and commentable web site is obtained, the steps or sequence may be automated (120) for each relevant and commentable web site without user intervention or with minimal user intervention. Not only may comments may be automated for each relevant and commentable web site but multiple comments, perhaps at multiple times, may be posted to each relevant and commentable web site.

Further, optionally (as most, if not all, of the steps of FIG. 1 are optional) the target web site may be modified (122) to increase the search engine ranking of the target web site.

Figure 2:
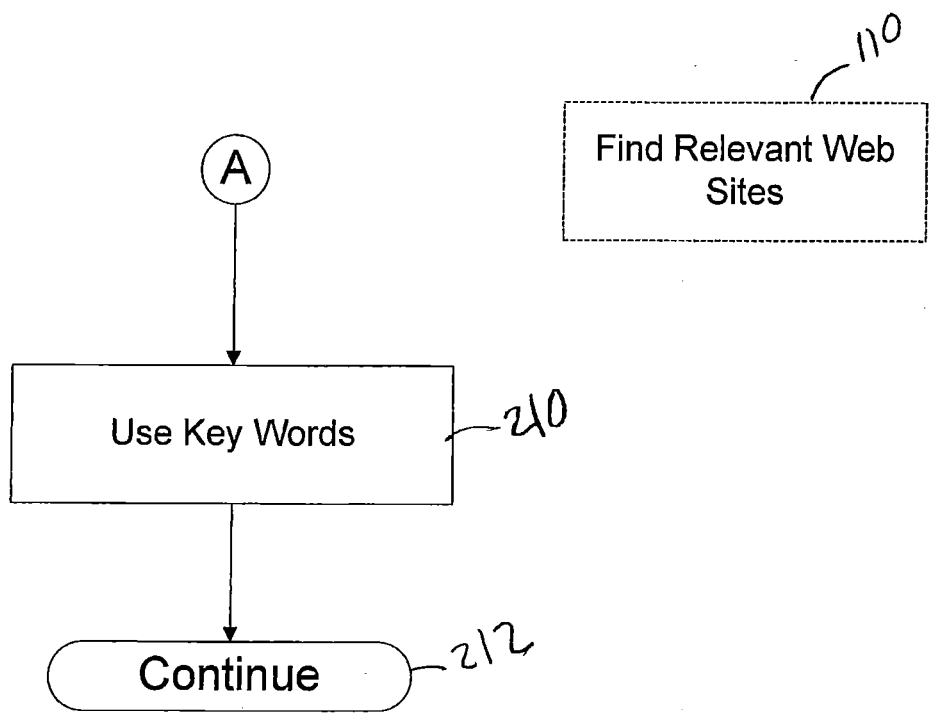
FIG. 2 is a flow chart illustrating detail of a portion of the flow chart of FIG. 1 related to finding relevant web sites.

Key words may be used (210) to assist in finding relevant web sites (110) (FIG. 2). A key word or key words or a key phrase may be performed using a conventional search engine. For example, if the target web site is related to wedding photography, it may be appropriate to use the search term or terms "photography", "photographer" or "wedding" to return a search result which contains a listing of web sites relevant to the target web site. After finding relevant web sites, the process may continue (212) by returning to the flow of FIG. 1, either to determining commenting step 112 or to one of the other steps illustrated in the flow chart of FIG. 1.

Figure 3:
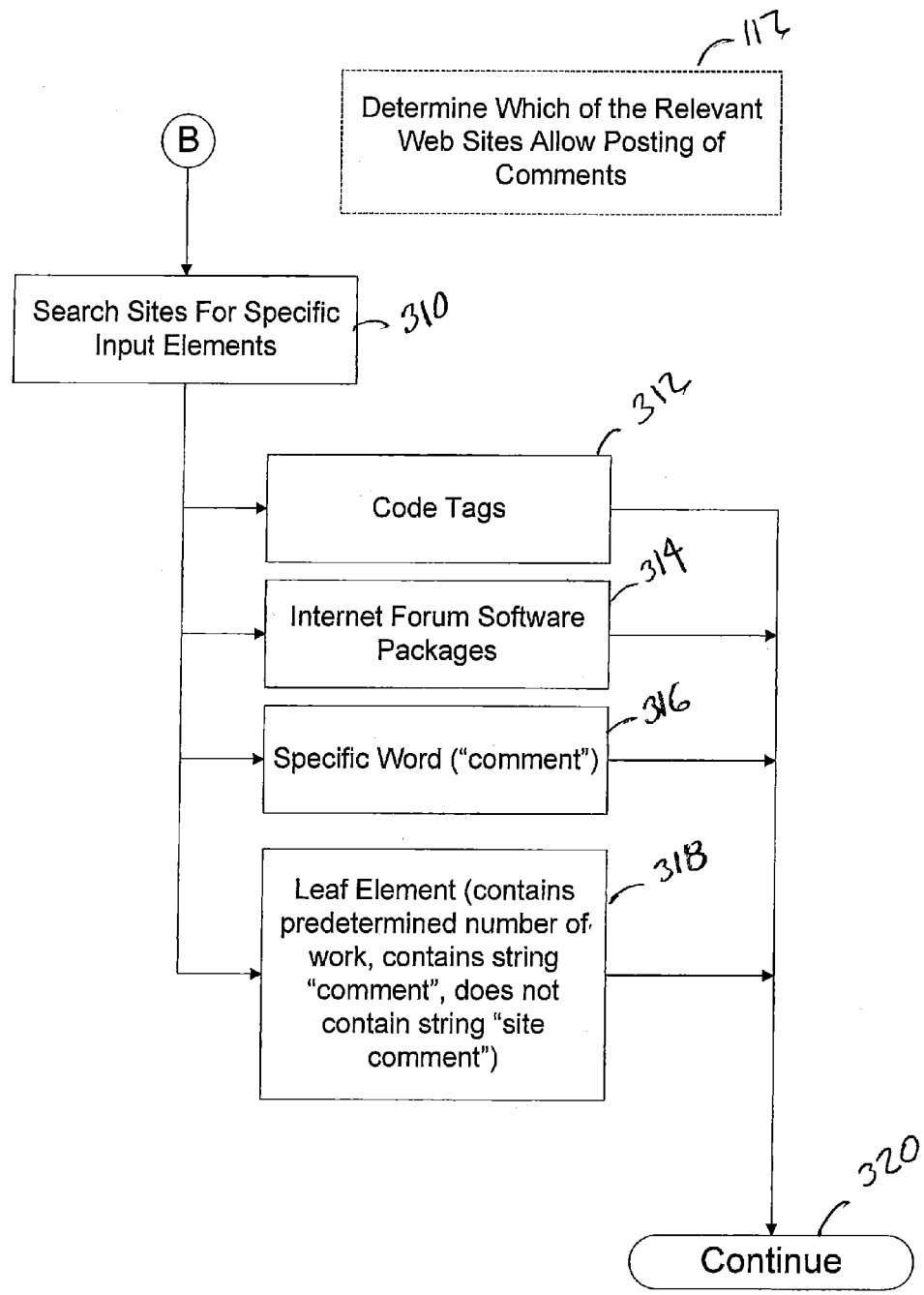
FIG. 3 is a flow chart illustrating detail of a portion of the flow chart of FIG. 1 related to determining which of the relevant web sites allow posting of comments.

FIG. 3 illustrates detail regarding the step of determining (112) which of the relevant web sites allow the posting of comments. Each relevant web site is individually searched (310) for specific input elements such as code tags (312), internet forum software packages (314), specific words (316) and/or leaf elements (318). Existing software facilitating the implementation of blogs or forums on each relevant web site may be searched (314) using known characteristics such as common and publicly available software packages. The existence of common and publicly available software is indicative of an individual web site accepting comments but also gives clues or identifies steps that are to be performed on that web site using the software package to leave comments. Specific words (316) that may be identifiable as being indicative of a web site accepting comments are the existence of certain words, for example, the word "comment". Leaf elements (318) are indicated by the existence of a certain word or certain words, perhaps in context of the existence of another word or words within a certain context, for example, within five words of each other. Another leaf element may the existence of a string containing a word and not another word. For example, the existence of a string containing the word "comment" and not the existence of a string containing the phrase "site comment" may be indicative of a commentable web site. After determining which web sites are commentable, the process may continue (320) by returning to the flow of FIG. 1, either to supplying step 114 or to one of the other steps illustrated in the flow chart of FIG. 1.

Figure 4:
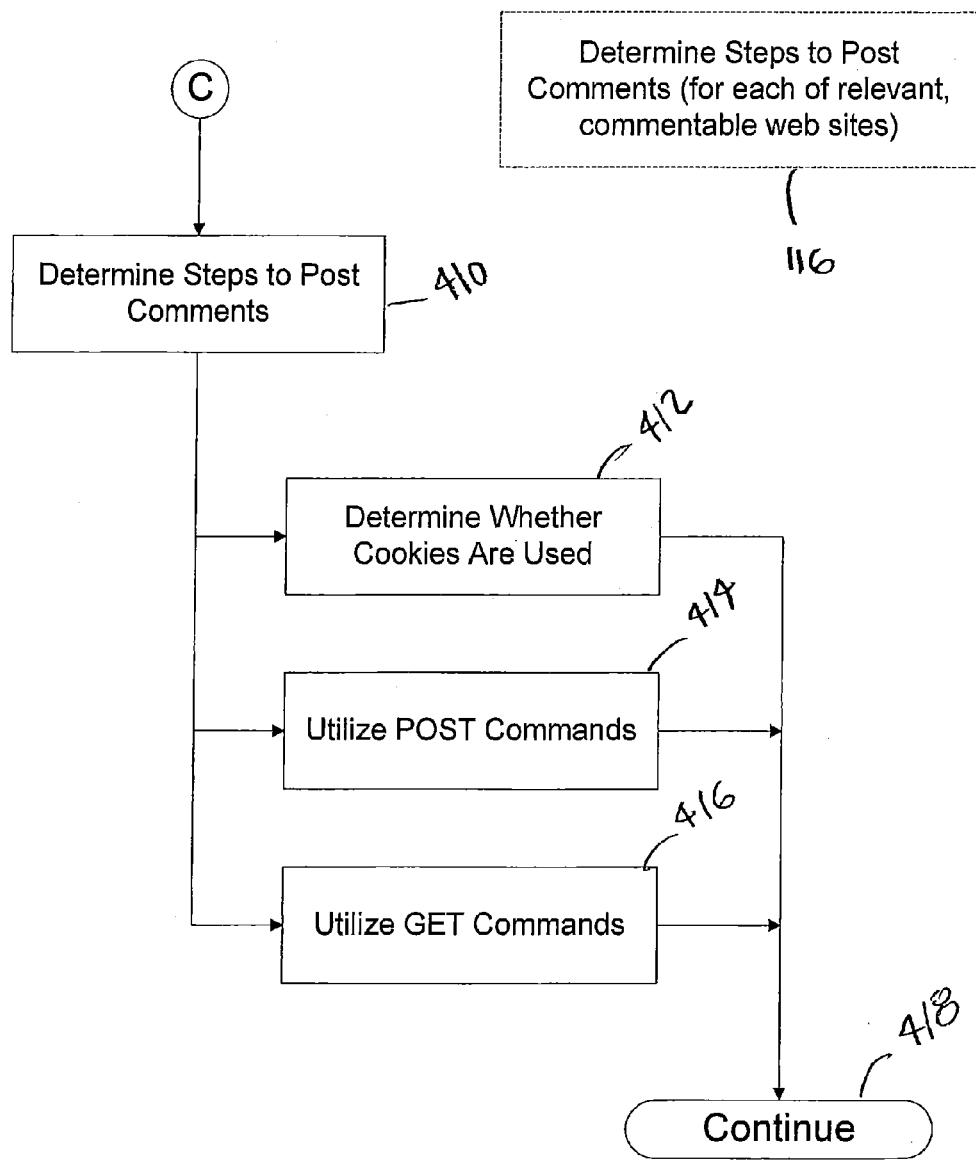
FIG. 4 is a flow chart illustrating detail of a portion of the flow chart of FIG. 1 related to determining steps to post comments on web sites.

FIG. 4 illustrates detail regarding the step of determining (116) the steps to post comments. Each relevant and commentable web site is analyzed (412) to determine whether or not "cookies" are utilized in the posting of comments on an individual site. If cookies are used or required then, as noted below, the cookie for each individual web site using cookies is determined and kept. Cookies would typically be required, if at all, to log into a web site as a prelude to posting comments. Each relevant and commentable web site is also analyzed to determine the use of "POST" commands (414) or "GET" commands (416). The use of POST and/or GET commands may assist in determining the steps required to post comments since such commands, or other similar commands, are fairly standard and well known. Hence, the procedures for responding to or using the POST and/or GET commands can also be more standardized. After determining which steps to take to post comments on each individual web site, the process may continue (418) by returning to the flow of FIG. 1, either to storing step 118 or to one of the other steps illustrated in the flow chart of FIG. 1.

Figure 5:
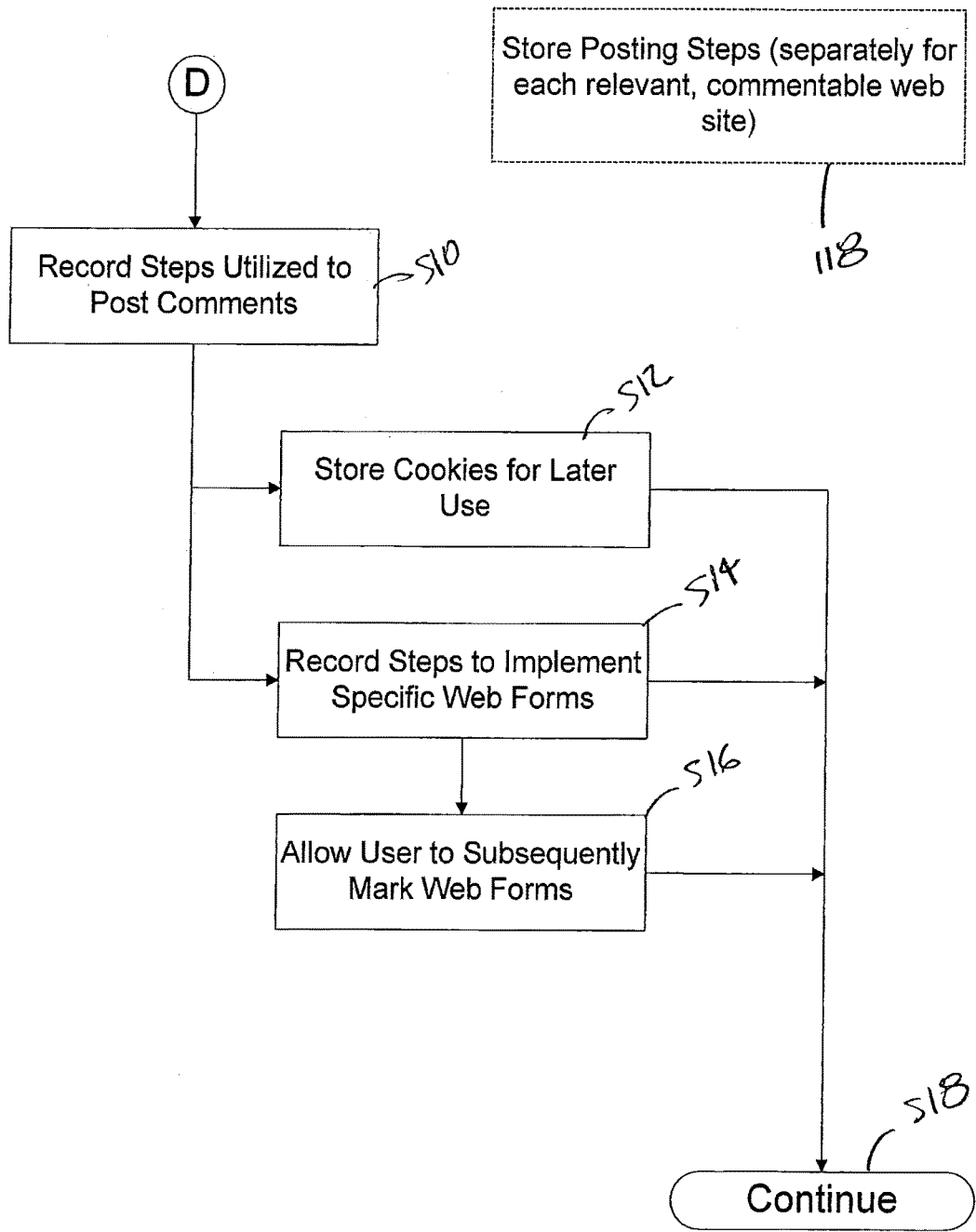
FIG. 5 is a flow chart illustrating detail of a portion of the flow chart of FIG. 1 related to storing posting steps to post comments on web sites.

FIG. 5 illustrates detail regarding the step of storing (118) the procedure to post comments. The steps utilized to post comments are recorded (510), perhaps in the manner of recording a macro if a user manually steps through the process of determining how to post comments. As noted above, if an individual web site uses or requires cookies to post comments, e.g., to log into the web site, then not only is the step of supplying the cookie be recorded but the content of the cookie is stored (512) so that the cookie may be supplied when the posting procedure is performed later. Further, if an individual web site uses a web form or web forms, the web form may be recorded (514), or at least the steps needed to fill the web form may be recorded. Further, the steps necessary, if any, for the user to mark or fill (516) the web form when the posting process is performed or repeated is also stored. After storing the steps required to post comments on each individual web site, the process may continue (518) by returning to the flow of FIG. 1, either to executing step 120 or to one of the other steps illustrated in the flow chart of FIG. 1.

Figure 6:
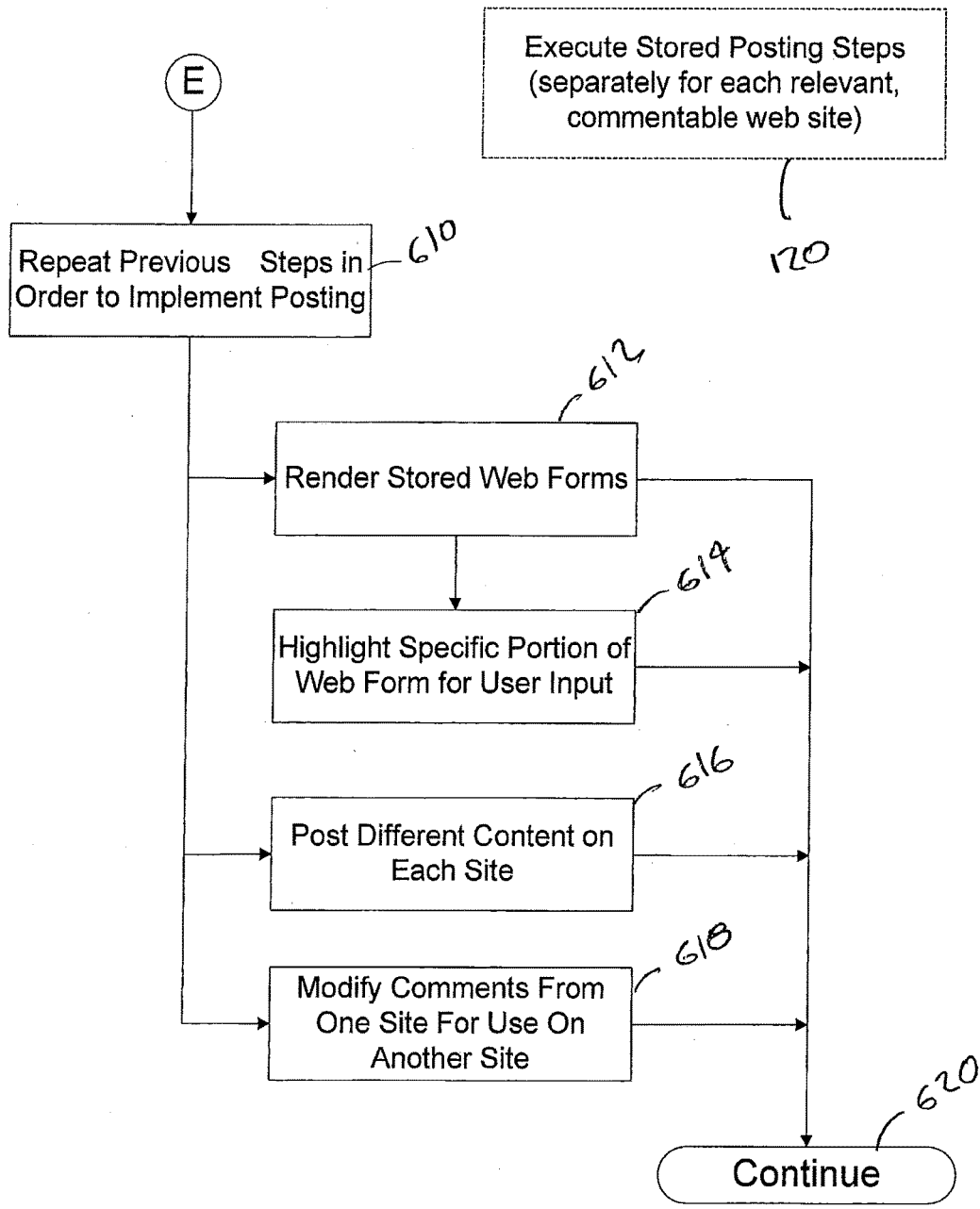
FIG. 6 is a flow chart illustrating detail of a portion of the flow chart of FIG. 1 related to executing stored posted steps to post comments on web sites.

FIG. 6 illustrates detail regarding the step of executing (120) the stored posting steps. The previously stored steps used or required to post comments on each of the individual relevant and commentable web sites are retrieved and executed (610) either for selected ones of the relevant and commentable web sites or for all of the relevant and commentable web sites individually and sequentially. Any web form used for an individual web site is retrieved and rendered (612) for use in posting a comment or comments on the individual web site. If a user is to make a manual input to any one or any portion of a web form, that specific portion requiring user input or user action is highlighted (614) on the rendered web form for ease in completing the web form. To help ensure that the same content doesn't end up being posted on each one of the relevant and commentable web sites, the content posted may be varied (616-618) from web site to web site. As an example, multiple versions of the basic text may be stored and different versions used on different web sites. After executing the stored instructions to post comments on each individual web site, the process may continue (620) by returning to the flow of FIG. 1, either to modification step 122 or to one of the other steps illustrated in the flow chart of FIG. 1.

Alternatively, varied content may be generated, created or modified comments or content, in order to post comments or other content to a plurality of web sites or at a plurality of times. In order to automatically generate, create or modify such comments or content, at least some of the following steps may be performed. In embodiments, only a subset of the entire filtering steps may be utilized.

Figure 7:
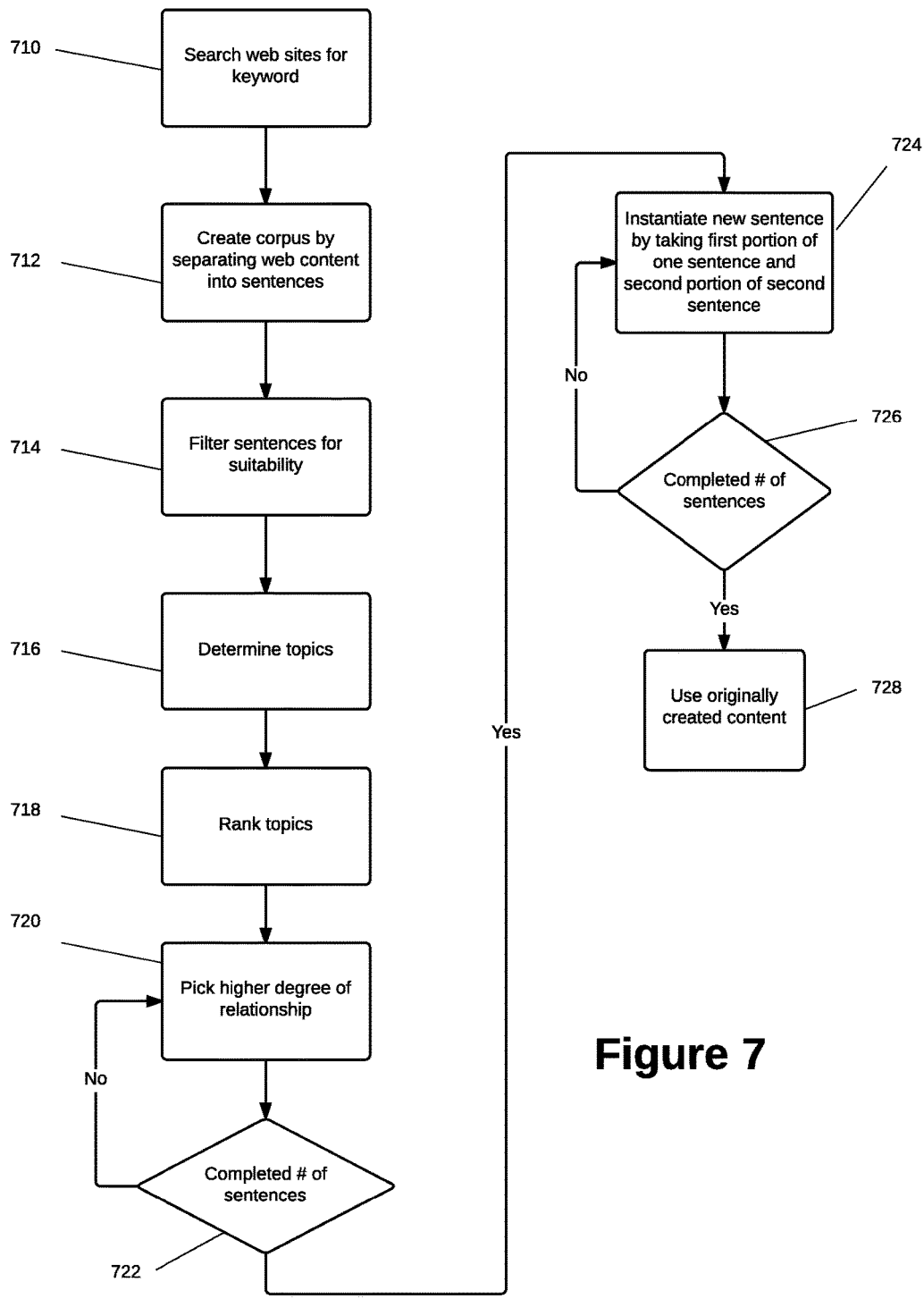
FIG. 7 is a flow chart illustrating steps that may be involved in creating content.

In general, a title and keyword, or a title, or a keyword is supplied and an article is automatically generated. In FIG. 7, predetermined material, such as the web or internet, is searched (710) using the title, a portion of the title, the keyword, or any or all of them and web content is gathered from the search and separated (712) into sentences creating a corpus. The results of the search are then filtered (714) for suitability. Many different criteria may be used to determine suitability or to eliminate suitability. In an embodiment, filtering involves examining certain parts of each sentence in the material for the existence of certain words or types of words. The existence of such certain words or types of words may have an inclusory result or an exclusory result. In embodiments, sentences either must or must not contain, begin, end, have more than a predetermined number of, have a predetermined percentage, or any of the above or all of the above, words or types of words. Or the words or types of words must or may not exist in a first predetermined number of words of the sentence, e.g., within the first ten (10) words of the sentence. Sentences or portions of sentences may be included or excluded based upon whether or not the sentence or the portion of sentence contains a reference or references to another document or to another portion of the same document. Once filtering has been completed, the uniqueness of the material is determined by determining (716) a topic for each of the sentences and ranking (718) each topic. In an embodiment, sentences or portions of sentences that have a higher uniqueness score, i.e., have a greater than a predetermined amount of uniqueness (more unlike other sentences and portions or sentences) are favored (720) for use in writing the article. Once ranking is completed, each new sentence to be created is completed (722), the sentences or portion of sentences or both available, article material is instantiated (724) using the sentences or portions of sentences until the number of new sentences to be created has been completed (726). The result is then ranked according to a predetermined ranking algorithm and the higher ranking sentences or portions of sentences are utilized (728) in the finished article.

In an embodiment or in certain embodiments, one or more of the following procedures may be used.

TASK I: User Enters a Title and Keyword, and an Article is Written for them.

The user enters a title and keyword.

A commercial API, such as the Bing API, is used to determine whether the selected title and keyword generate adequate search engine traffic for us to be able to write a good article. More traffic generally means that more content related the title and keyword can be found, which in turn means that our algorithms can generally produce a higher-quality article.

If the title and keyword do not generate adequate search engine traffic, a related title and keyword are picked that do. The user is not exposed to this change, though; it is strictly an internal step for our own processes and algorithms.

An API, such as the Bing API, is used to gather web content related to the keyword and title.

The textual part of the web content is separated into sentences using open-source code. For the remainder of Task I, the word "corpus" refers to these sentences collectively.

The corpus is filtered according to various criteria. In an embodiment, predetermined criteria, preferably word and/or sentence structure criteria, is used to choose a subset of the corpus for further processing. In some embodiments, the criteria are selected to avoid sentences or portions of sentences that are not most directly related to the underlying topic, e.g., referring to specific entities or individuals or which detract or take away from the underlying topic. In embodiments, these criteria may be at least one of the following:

First, it must not be the case that the portion of the sentence consisting of all but the final word can be classified as a noun phrase, verb phrase, prepositional phrase, or unlike coordinated phrase.

Second, it must not be the case that the sentence begins with a verb.

Third, the sentence must end with a period.

Fourth, the sentence must contain no more than ten capitalized words.

Fifth, at least half of the words of the sentence must be in a particular language, e.g., English.

Sixth, the sentence must not begin with any of the following strings:
"Again",
"And",
"But",
"Can",
"Does",
"For example",
"For instance",
"He",
"How",
"Instead",
"It",
"Nonetheless",
"Or",
"Returning",
"She",
"Should",
"So",
"That",
"The above",
"The answer",
"The author",
"The below",
"The company",
"The conference",
"The first",
"The following",
"The idea",
"The other",
"The same",
"The second",
"The study",
"The third",
"The tool",
"Their",
"They",
"This author",
"This company",
"This conference",
"This idea",
"This study",
"This tool",
"Watch",
"What",
"Why", and
"Yet".

Seventh, none of the following words may appear in the first ten words of the sentence unless the user-supplied title or keyword contains one or more of the following words:
"also",
"he", "her",
"him",
"information",
"it",
"other",
"program",
"she",
"such",
"system",
"that",
"them",
"they", and
"this".
Eighth, none of the following words may appear in the sentence unless the user-supplied title or keyword contains one or more of the following the words:
"according",
"article",
"ass",
"book",
"calculator",
"damn",
"different from",
"elimination",
"feces",
"libromyalgia",
"forum",
"free",
"fuck",
"gas",
"here",
"however",
"i",
"i'd",
"i'll",
"i'm",
"me"
"my",
"our",
"poo",
"poop",
"pregnant",
"review",
"reviews",
"shit",
"stool",
"stools",
"thanks",
"therefore",
"these",
"this",
"those",
"thus",
"urine",
"us",
"video",
"we", and
"worksheet".
Ninth, the sentence must be between 15 and 30 words long.
Tenth, the sentence may not contain a symbol such as any of the following strings:
"#",
"!",
"?",
"\",
"(",
")",
",",
";",
":",
"-",
"_",
"*",
"...",
"<",
">",
"{",
"}",
"•",
"|", or, the sentence may not contain a reference to another portion of the document such as any of the following phrases:
"reasons below",
"below reasons",
"arguments below",
"below arguments",
"list below",
"below list",
"reasons above",
"above reasons",
"arguments above",
"above arguments",
"list above",
"above list",
"the report", and
"this report".

A Latent Dirichlet Allocation topic model is applied to the corpus (see Dirichlet Allocation below). Each web page is treated as a document (in the technical sense of a topic model). Natural language text fragments from each web page are extracted and concatenated to create the document. For the remainder of Task I, the word "topics" refers to the topics inferred by this topic model.

With the goal of generating one paragraph of original text for each of several topics, the topics are ranked according to a proprietary uniqueness metric, in which topics with higher uniqueness scores generally yield better (i.e. more coherent and natural) paragraphs.

The uniqueness metric is computed as follows:

Computation of a Latent Dirichlet Allocation topic model generally uses a procedure known as Gibbs sampling. Gibbs sampling is a Markov chain Monte Carlo (MCMC) algorithm for obtaining a sequence of observations which are approximated from a specified multivariate probability distribution, i.e., from the joint probability distribution of two or more random variables, when direct sampling is difficult. This sequence can be used to approximate the joint distribution, e.g., to generate a histogram of the distribution; to approximate the marginal distribution of one of the variables, or some subset of the variables, e.g., the unknown parameters or latent variables; or to compute an integral, such as the expected value of one of the variables. Typically, some of the variables correspond to the observations whose values are known and, hence, do not need to be sampled. Gibbs sampling is commonly used as a means of statistical inference, especially Bayesian influence. It is a randomized algorithm, i.e., an algorithm that makes use of random numbers, and, hence, may produce different results each time it is run, and is an alternative to deterministic algorithms for statistical inference such as variational Bayes or the expectation-maximization algorithm (EM). As with other MCMC algorithms, Gibbs sampling generates a Markov chain of samples, each of which is correlated with nearby samples. As a result, care must be taken if independent samples are desired (typically by thinning the resulting chain of samples by only taking every nth value, e.g., every 100$^{th}$ value). In addition (again, as in other MCMC algorithms), samples from the beginning of the chain (the burn-in period) may not accurately represent the desired distribution.

One aspect of Gibbs sampling in this context is the computation of a weight for each word and topic in our corpus. So the word "cat" might have a weight of 25 in topic 3, and the word "dog" might have a weight of 4 in topic 37. As the first step in the computation of the uniqueness metric, for each word, the variance of that word is computed across topics.

Then, for each topic, the following procedure is applied: for each word in that topic, the product of "the variance of the word weight of that word across topics" and "the word weight of that word in that specific topic" is computed, then take the average of those products, and then square the average. The resulting value is the uniqueness metric.

In an embodiment, topics that are strongly "unique" are identified that are strongly associated with potent, interesting, and possibly unique words.

Each topic consists of a set of weighted words. The weights are analogous to probabilities. The following three topics are examples.

Topic 1:
    dog, 0.4
    cat, 0.3
    pets, 0.25
    chocolate, 0.01
    oregano, 0.005

Topic 2:
    spaghetti, 0.75
    ziti, 0.6
    oregano, 0.5
    cat, 0.05
    slippers, 0.02

Topic 3:
    shoes, 0.3
    slippers, 0.1
    pets, 0.002

In this example, Topic 1 is about pets, Topic 2 is about Italian food and Topic 3 is about shoes. The relevant words have higher weights than the irrelevant words, which appear sporadically.

The first step in the computation of the topic uniqueness metric is, for each word in the corpus, to compute the variance of the weights of the word across all topics. If a word is present in all topics and has similar weights in all topics, it will have a low variance, because variance is a measure of how far a set of numbers is spread out. If a word is strongly associated with one topic but not others, it will have a high variance. Of primary interest are words with high variance, since these words are the potent, interesting, and possibly unique words mentioned above: they are associated very strongly with certain topics but very weakly with others.

Once the variances have been computed, a uniqueness metric for each topic is computed by taking the average of the products of word weight and word variance over all words in the topic. So for Topic 1 above, the uniqueness metric would be:

$$(0.4 \times var(dog) + 0.3 \times var(cat) + 0.25 \times var(pets) + 0.01 \times var(chocolate) + 0.005 \times var(oregano))/5.$$

High-variance words that are weighted highly in the topic contribute greatly to its uniqueness, but low-variance words that are weighted lightly do not.

Once the uniqueness of each topic has been computed, topics are ranked in descending order by uniqueness (higher uniqueness is better). Finally, topics are privileged that contain all words of the article title and moved to the head of the list. For example, if an article title is "Best Dog Food for Senior Dogs", we'd privilege a topic that contains "Best", "Dog", "Food", "Senior", and "Dogs"; "for" is filtered out as too common. The resulting list of topics determines the content of the paragraphs of the article to be written.

The article to be written is instantiated as an empty string of text. The technique then iterates through the topics by descending uniqueness scores and apply the following procedure to each topic until the article reaches a predetermined word count (for example, 500 words):

1. Fix a target number of sentences for the current topic (usually 4 or 5).
2. Instantiate a paragraph for the topic as an empty string of text.
3. Apply a proprietary variant of the TextRank/LexRank algorithm to rank individual sentences according to their level of suitability as a summary of content related to the current topic.

Assuming that a topic has been specified for the paragraph, the 200 sentences from our corpus most relevant to the specified paragraph are chosen. A graph is built with 200 vertices, each representing one of the 200 sentences. Each vertex is assigned an initial score corresponding to the relevance of the corresponding sentence to the specified topic. Edge weights are computed for each vertex pair according to the number of words the corresponding sentence pair has in common, with the following caveats: the words must be the same part of speech (so "code" as a noun and "code" as a verb would not be words in common), and the words must not be common English stop words (Google "English stop words" for examples). The top 7,500 edge weights are retained and the remaining edge weights are set to zero. A PageRank algorithm is applied to the resulting graph. The sentences are ranked according to descending vertex scores after the completion of the PageRank algorithm.

Individual sentences are iterated through by descending suitability score, and in doing so collect the top N (N is configurable by us to be any positive integer) most suitable sentences, subject to the following restrictions: a) any sentence is not used more than once in an article, and b) not more than one sentence from any single web source is included in an article. Then the sentence is chosen among these N sentences that most closely matches the topic composition of the paragraph under construction (the first sentence of each paragraph is an exception; in this case simply choose the sentence with the highest suitability score and skip the topic composition step). If the user has not requested to a rewrite each sentence, this sentence is appended to the current paragraph until the target number of sentences for the paragraph is reached. If the user has requested to a rewrite each sentence, the algorithm described in Task III is applied and then, if the algorithm is successful, the rewritten sentence is appended to the current paragraph until the target number of sentences for the paragraph is reached. Once the target number of sentences for the paragraph is reached, the paragraph is appended to the article and the technique then proceeds to the next topic/paragraph until the predetermined word count for the article is reached.

TASK II: User Enters a Keyword, and Automatic Generation of Article Titles.

The user enters a keyword.

The Bing API is used to gather web content related to the keyword and title.

The web content is separated into sentences using open-source code. For the remainder of Task II, the word "corpus" refers to these sentences collectively.

The corpus is filtered by requiring that the sentence must contain the user-specified keyword.

Noun phrases (e.g. "the lazy brown dog") are extracted from the corpus using open-source software, such as the Stanford Parser from the Stanford Natural Language Processing Group, which is commonly available and downloadable from stanford.edu (http://nlp.stanford.edu/software/lex-parser.shtml). This software is a natural language parser that works out the grammatical structure of sentences, for instance, which groups of words go together (as "phrases") and which words are the subject or object of a verb. Probabilistic parsers use knowledge of language gained from hand-parsed sentences to try to produce the most likely analysis of new sentences.

The noun phrases are filtered according to the following criteria. The filtered noun phrase list forms a pool from which article titles are drawn.

The number of words in the noun phrase must be no less that the number of words in the user-specified keyword (which may be more than one word, like "dog food") plus one and no more than the number of words in the user-specified keyword plus four. No more than half of the words in the noun phrase may be capitalized. The noun phrase may not contain the words "countdown" or "quiz" unless the user-specified keyword contains these words. The noun phrase may only contain those digits that appear in the user-specified keyword. The noun phrase may not contain the spelling of a number between 1 and 20 ("one", "two", . . . , "twenty") unless the user-specified keyword also does. The noun phrase may not contain any punctuation other than one or more periods A Latent Dirichlet Allocation topic model is applied to the corpus (see Latent Dirichlet Allocation below). Each sentence is treated as a document (in the technical sense of a topic model) rather than each webpage or some other unit of organization. For the remainder of Task II, the word "topics" refers to the topics inferred by this topic model.

For each topic in the Latent Dirichlet Allocation model, the noun phrase that is most relevant to that topic is chosen and the probability of that noun phrase being relevant to that topic is recorded. Thus, a map is created from noun phrases to probabilities.

To generate N titles, the map is sorted by descending probability and the top N noun phrases are chosen resulting in a sorted map.

TASK III: Rewrite a Sentence, Given the Topic Model and Corpus of Task I.

From the topic model and corpus from Task I, the next task is to rewrite one sentence of the corpus (the "original sentence") so that its sources are not apparent from a cursory online search. Generally, part of another sentence in the corpus is substituted for part of the original sentence.

Using open-source code, such as the Stanford Parser from the Stanford Natural Language Processing Group identified above, all noun phrases ("the lazy brown dog") and verb phrases ("jumped over the moon") in our corpus are identified. "NP" will designate "noun phrase" and "VP" will designate "verb phrase".

The technique iterates through each NP and VP of the original sentence and each NP and VP of each other sentence in our corpus to compile a list of all possible NP-NP and VP-VP pairs whose first element is a component of the original sentence and whose second element is a component of another sentence. Many of these pairs are filtered out in accordance with one or more of the following criteria ("Elements" refers to the noun phrases and verb phrase that comprise the NP-NP and VP-VP pairs, so that each pair contains two "elements" while "base sentence" refers to the sentence from which the first element of a pair is drawn and "replacement sentence" refers to the sentence from the second element of the pair is drawn):

Criterion i) Neither the base nor replacement sentence may contain the word "than";

Criterion ii) Neither the base nor replacement sentence may begin with the word "these", "this", or "those";

Criterion iii) The first element must be no shorter than 30% of the length of the base sentence and no longer than 75% the length of the base sentence, as measured by word count;

Criterion iv) The second element must be no shorter than 25% of the length of the replacement sentence and no longer than 70% the length of the replacement sentence as measured by the word count;

Criterion v) The first element must either begin with the first word of the base sentence or end with the last word of the base sentence;

Criterion vi) If the first element begins with the first word of the base sentence, then the second element must begin with the first word of the replacement sentence. If the first element ends with the last word of the base sentence, then the second element must end with the last word of the replacement sentence;

Criterion vii) Neither the first element nor the second element may contain a comma;

Criterion viii) The first element and second element must contain the same number of capitalized words;

Criterion ix) The third word of the first element may not be "to";

Criterion x) It must not be the case that all of the following conditions hold:
  The first element ends with the last word of the base sentence;
  The first element is preceded by the word "to" in the base sentence;
  The aforementioned word "to" is preceded by a present participle in the base sentence;

Criterion xi) It must not be the case that all of the following conditions hold: the second element ends with the last word of the replacement sentence; the second element is preceded by the word "to" in the replacement sentence; the aforementioned word "to" is preceded by a present participle in the replacement sentence;

Criterion xii) IF the first element ends with the last word of the base sentence AND the first element is preceded by the word "to" in the base sentence THEN the second element must be preceded by the word "to" in the replacement sentence.

Criterion xiii) A "link length" between two elements is defined as follows: the link length between two elements is the number of consecutive words, counting from the start of each element, that the elements have in common. So, for example, the link length between "the cow jumped over the moon" and "the cow jumped upon the table" would be three (3). In an embodiment, the link length between pairs of elements is equal to at least one plus the number of words in common that appear in a predetermined list. In an embodiment, the predetermined list are the words:
"a",
"an",
"are",
"be",
"best",
"can",
"could",
"few",
"from",
"get",
"have",
"in",
"is",
"it",
"its",
"make"
"many",
"may",
"need",
"of",
"on"
"one",
"should"
"some",
"than",
"that"
"the",
"their",
"they",
"to",
"use",
"want",
"when"
"will"
"with",
"would",
"you", and
"your".

Criterion xiv) If the first element contains the word "that" or the word "which" or both, then the second element must contain the word "that" or the word "which" or both.

Criterion xv) The word lengths of the first and second elements may not differ by more than five (5).

Criterion xvi) The second element must not contain more than one common English stopword.

Criterion xvii) A similarity metric between two elements is computed as follows:
1) Start the metric at zero;
2) Set a value called "lastMatch" to minus one (−1);
3) Begin at the first word of the first element and apply the following procedure to each successive word of the first element: start at the word occupying the (lastMatch+1)th position in the second element and apply the following procedure to each successive word of the second element: add one (1) to the metric each time the word from the first element and the word from the second element are equal, and set lastMatch equal to the index of the word in the second element.
4) set lastMatch to minus one (−1) again.
5) Apply step 3 again with the first and second elements reversed.
6) Divide the metric by the sum of the word lengths of the elements.

The metric should be less than a predetermined number. In an embodiment, the metric thus computed should be less than 0.8.

Once a pool of pairs of elements has been established which are candidates for replacement, i.e., for the first element being replaced by the second element in the sentence undergoing revision, various sorting and evaluation mechanisms are applied to choose a single pair from the pool as described below.

The first step is to assign a content similarity metric to each pair. The metric may be computed as follows:
1) Consider the base sentence from which the first element is extracted. A new string of words, the "base metric string", is created from this sentence by removing all words that appear in our text corpus, in one embodiment, exactly once. The same procedure is applied to the replacement sentence from the which the second element is extracted to create a resulting string called "replacement metric string."
2) The Latent Dirichlet Allocation model that was created in the content generation process is applied to both the base metric string and the replacement metric string in order to compute the probability of each string being "about" each topic in the model.
3) For each topic, the square of the difference of the probabilities of each string being about the topic is computed.
4) The content similarly metric is the sum of the probability computed in 2) above and the square of the difference computed in 3) above.

The pool of pairs is then sorted into unordered subsets determined by the first element. As an example, if the base sentence is "The cow jumped over the moon, and the little dog laughed to see such fun.", one subset of pairs would consist of all pairs whose first element is "the cow jumped over the moon", and another subset would consist of all pairs whose first element is "the little dog laughed to see such fun". Generally, all possible replacements are looked at for one part of the base sentence, then all possible replacements for another part, etc. Any subsets with fewer than five elements may be discarded.

The pairs with each subset are sorted by a mechanism similar to the Text Rank/Lex Rank extension discussed above. The second element of each pair within a subset is considered as an independent string and the TextRank/LexRank is applied to these strings. The goal is to find strings that have the character of an authoritative summary of the available content. This implementation of TextRank/LexRank differs from the implementation above in two respects:

Difference 1) Because of the criteria of selecting pairs of elements in any given subset of pairs described above will begin with words in common, like "the cow" or "the dog". When computing edge weights, such pairs in common are disregarded.

Difference 2) Vertex priors are set to the value of the content similarity metric described above.

Once the TextRank/LexRank is applied, the pairs for each subset are sorted according to the vertex score of the second element of the pair. The result is that, for various NP/VP elements of the base sentence, lists of replacement NP/VP elements are created and sorted by summative quality. Visually, for the sentence "The cow jumped over the moon, and the little dog laughed to see such fun.", the situation might be as follows:

| replacement rank | "the cow jumped over the moon" | "the little dog laughed to see such fun" |
|---|---|---|
| 1 | the cow leapt into the sky | the little dog grinned and scampered around |
| 2 | the cow ran across the field | the little dog played with a bone |
| 3 | the cow sang a song | the little dog was afraid of spiders |
| ... | ... | ... |

A specific base/replacement pair is now chosen. To do this, we iterate through "ranks" of replacements, i.e., the best replacements for portions of the base sentence, the second-best replacements for portions of the base sentence, etc., via the following procedure until a satisfactory replacement is found:

1) Start at the top rank of replacements (replacement rank=1 in the chart above).
2) Gather all the replacements in the current rank into a set, and then discard any whose vertex scores are above 1.0.
3) For each remaining replacement in the set, compute a grammatical similarity metric between the base element and replacement element as follows: Consider the base sentence and a hypothetical rewritten sentence in which the replacement element is substituted for the base element. For both sentences, compute the total number of words belonging to Penn Treebank grammatical categories (from the Association of Computational Linguistics) such as noun phrase, verb phrase, prepositional phase, etc. Grammatical elements with length 1 are ignored, i.e., a single word is not considered to be its own element. The metric is equal to the sum of squared differences of total numbers of words in each grammatical category between the two sentences.
4) Sort the set by the metric and consider the replacement with the highest metric. If this metric is no greater than 750, we consider the replacement to be satisfactory. If no satisfactory replacement exists, repeat steps 2-4 with the next rank of replacements.

If this process terminates with a satisfactory replacement, it is used to rewrite a sentence by replacing the first element with the second element in the base sentence. If no satisfactory replacement can be found, we label the base sentence as unworkable and move on to a new base sentence.

The first element of the highest ranked pair in the original sentence is replaced with its second element. The resulting new sentence is the final rewritten sentence.

Summarization

TextRank is a general purpose graph-based ranking algorithm for NLP. Essentially, it runs PageRank on a graph specially designed for a particular NLP task. For key phrase extraction, it builds a graph using some set of text units as vertices. Edges are based on some measure of semantic or lexical similarity between the text unit vertices. Unlike PageRank, the edges are typically undirected and can be weighted to reflect a degree of similarity. Once the graph is constructed, it is used to form a stochastic matrix, combined with a damping factor (as in the "random surfer model"), and the ranking over vertices is obtained by finding the eigenvector corresponding to eigenvalue 1 (i.e., the stationary distribution of the random walk on the graph).

Vertices

The vertices should correspond to what is to be ranked. Potentially, something similar to the supervised methods could be done and a vertex for each unigram, bigram, trigram, etc. could be created. However, to keep the graph small, unigrams are ranked individually in a first step, and then include a second step that merges highly ranked adjacent unigrams to form multi-word phrases. This has a nice side effect of allowing us to produce key phrases of arbitrary length. For example, if unigrams are ranked and find that "advanced", "natural", "language", and "processing" all get high ranks, then the original text is looked at and see that these words appear consecutively and create a final key phrase using all four together. Note that the unigrams placed in the graph can be filtered by parts of speech. The authors found that adjectives and nouns were the best to include. Thus, some linguistic knowledge comes into play in this step.

Edges

Edges are created based on word co-occurrence in this application of TextRank. Two vertices are connected by an edge if the unigrams appear within a window of size N in the original text. N is typically around 2-10. Thus, "natural" and "language" might be linked in a text about NLP. "Natural" and "processing" would also be linked because they would both appear in the same string of N words. These edges build on the notion of "text cohesion" and the idea that words that appear near each other are likely related in a meaningful way and "recommend" each other to the reader.

Final Key Phrases Formed

Since this method simply ranks the individual vertices, a way to threshold or produce a limited number of key phrases is desired. The technique chosen is to set a count T to be a user-specified fraction of the total number of vertices in the graph. Then the top T vertices/unigrams are selected based on their stationary probabilities. A post-processing step is then applied to merge adjacent instances of these T unigrams. As a result, potentially more or less than T final key phrases will be produced, but the number should be roughly proportional to the length of the original text.

Why it Works

It is not initially clear why applying PageRank to a co-occurrence graph would produce useful key phrases. One way to think about it is the following. A word that appears multiple times throughout a text may have many different co-occurring neighbors. For example, in a text about machine learning, the unigram "learning" might co-occur with "machine", "supervised", "un-supervised", and "semi-supervised" in four different sentences. Thus, the "learning" vertex would be a central "hub" that connects to these other modifying words. Running PageRank/TextRank on the graph is likely to rank "learning" highly. Similarly, if the text contains the phrase "supervised classification", then there would be an edge between "supervised" and "classification". If "classification" appears several other places and thus has many neighbors, its importance would contribute to the importance of "supervised". If it ends up with a high rank, it will be selected as one of the top T unigrams, along with "learning" and probably "classification". In the final post-processing step, the result would be key phrases "supervised learning" and "supervised classification".

In short, the co-occurrence graph will contain densely connected regions for terms that appear often and in different contexts. A random walk on this graph will have a stationary distribution that assigns large probabilities to the terms in the centers of the clusters. This is similar to densely connected Web pages getting ranked highly by PageRank.

Latent Dirichlet Allocation

In natural language processing, Latent Dirichlet Allocation (LDA) is a generative model that allows sets of observations to be explained by unobserved groups that explain why some parts of the data are similar. For example, if observations are words collected into documents, it posits that each document is a mixture of a small number of topics and that each word's creation is attributable to one of the document's topics. LDA is an example of a topic model and was first presented as a graphical model for topic discovery by David Blej, Andrew Ng, and Michael Jordan in 2003.

Topics in LDA

In LDA, each document may be viewed as a mixture of various topics. This is similar to probabilistic latent semantic analysis (pLSA), except that in LDA the topic distribution is assumed to have a Dirichlet prior. In practice, this results in more reasonable mixtures of topics in a document. It has been noted, however, that the pLSA model is equivalent to the LDA model under a uniform Dirichlet prior distribution.

For example, an LDA model might have topics that can be classified as CAT related and DOG related. A topic has probabilities of generating various words, such as milk, meow, and kitten, which can be classified and interpreted by the viewer as "CAT related". Naturally, the word cat itself will have high probability given this topic. The DOG related topic likewise has probabilities of generating each word: puppy, bark, and bone might have high probability. Words without special relevance, such as the (see function word), will have roughly even probability between classes (or can be placed into a separate category). A topic is not strongly defined, neither semantically nor epistemologically. It is identified on the basis of supervised labeling and (manual) pruning on the basis of their likelihood of co-occurrence. A lexical word may occur in several topics with a different probability, however, with a different typical set of neighboring words in each topic.

Each document is assumed to be characterized by a particular set of topics. This is akin to the standard bag of words model assumption, and makes the individual words exchangeable.

Model

Figure 8:
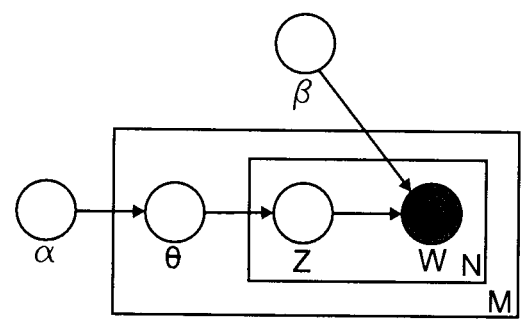
FIG. 8 is a Plate Notation Representing a Latent Dirichet Allocation model.

A Plate Notation Representing a LDA Model is Illustrated in FIG. 8.

With plate notation, the dependencies among the many variables can be captured concisely. The boxes are "plates" representing replicates. The outer plate represents documents, while the inner plate represents the repeated choice of topics and words within a document. M denotes the number of documents, N the number of words in a document. Thus:

α is the parameter of the Dirichlet prior on the per-document topic distributions, β is the parameter of the Dirichlet prior on the per-topic word distribution, $\theta_i$ is the topic distribution for document i, $\phi_k$ is the word distribution for topic k, $z_{ij}$ is the topic for the jth word in document i, and $W_{ij}$ is the specific word.

Figure 9:
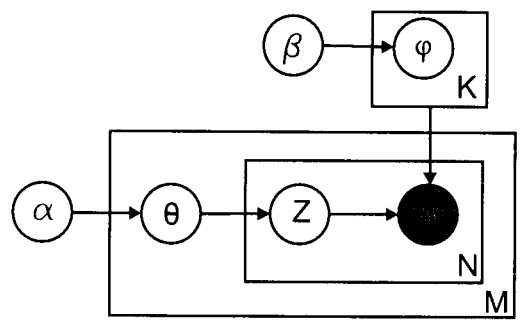
FIG. 9 is a Plate Notation for a Smoothed Latent Dirichet Allocation model.

A Plate Notation for Smoothed LDA is Illustrated in FIG. 9.

The $w_{ij}$ is the only observable variable, and the other variables are latent variables. Mostly, the basic LDA model will be extended to a smoothed version to gain better results. The plate notation is shown on the right, where K denotes the number of topics considered in the model and:

φ is a K*V (V is the dimension of the vocabulary) Markov matrix each row of which denotes the word distribution of a topic.

The generative process behind documents are represented as random mixtures over latent topics, where each topic is characterized by a distribution over words. LDA assumes the following generative process for a corpus D consisting of M documents each of length $N_i$:

1. Choose $\theta_i \sim \text{Dir}(\alpha)$, where $i \in \{1, \ldots, M\}$ and $\text{Dir}(\alpha)$ is the Dirichlet distribution for parameter α

2. Choose $\phi_k \sim \text{Dir}(\beta)$, where $k \in \{1, \ldots, K\}$

3. For each of the word positions, i, j, where $j \in \{1, \ldots, N_i\}$, and $i \in \{1, \ldots, M\}$ (a) Choose a topic $z_{i,j} \sim \text{Multinominal}(\theta_i)$.

(b) Choose a word $w_{i,j} \sim \text{Multinominal}(\phi_{z_{i,j}})$.

(Note that the Multinomial distribution here refers to the Multinomial with only one trial. It is formally equivalent to the categorical distribution.)

The lengths $N_i$ are treated as independent of all the other data generating variables ($\mathcal{Y}$ and z). The subscript is often dropped, as in the plate diagrams shown here.

Mathematical Definition

A formal description of smoothed LDA is as follows:

Definition of Variables in the Model

| Variable | Type | Meaning |
|---|---|---|
| K | integer | number of topics (e.g. 50) |
| V | integer | number of words in the vocabulary (e.g. 50,000 or 1,000,000) |
| M | integer | number of documents |
| $N_{d=1\ldots M}$ | integer | number of words in document d |
| N | integer | total number of words in all documents; sum of all $N_d$ values, i.e. $N = \sum_{d=1}^{M} N_d$ |
| $\alpha_{k=1\ldots K}$ | positive real | prior weight of topic k in a document; usually the same for all topics; normally a number less than 1, e.g. 0.1, to prefer sparse topic distributions, i.e. few topics per document |
| α | K-dimension vector of positive reals | collection of all $\alpha_k$ values, viewed as a single vector |
| $\beta_{w=i\ldots V}$ | positive real | prior weight of word w in a topic; usually the same for all words; normally a number much less than 1, e.g. 0.001, to strongly prefer sparse word distributions, i.e. few words per topic |
| β | V-dimension vector of positive reals | collection of all $\beta_w$ values, viewed as a single vector |
| $\phi_{k=1\ldots K, w=1\ldots V}$ | probability (real number between 0 and 1) | probability of word w occurring in topic k |
| $\phi_{k=1\ldots K}$ | V-dimension vector of probabilities, which must sum to 1 | distribution of words in topic k |
| $\theta_{d=1\ldots M, k=1\ldots K}$ | probability (real number between 0 and 1) | probability of topic k occurring in document d for a given word |
| $\theta_{d=1\ldots M}$ | K-dimension vector of probabilities, which must sum to 1 | distribution of topics in document d |
| $z_{d=1\ldots M, w=1\ldots N_d}$ | integer between 1 and K | identity of topic of word w in document d |

-continued

| Variable | Type | Meaning |
| --- | --- | --- |
| Z | N-dimension vector of integers between 1 and K | identity of topic of all words in all documents |
| $w_{d=1...M, w=1...N_d}$ | integer between 1 and V | identity of word w in document d |
| W | N-dimension vector of integers between 1 and V | identity of all words in all documents |

The random variables can be mathematically described as follows:

| | |
| --- | --- |
| $\phi_{k=1...K}$ | $\text{Dirichlet}_V(\beta)$ |
| $\theta_{d=1...M}$ | $\text{Dirichlet}_K(\alpha)$ |
| $z_{d=1...M, w=1...N_d}$ | $\text{Categorical}_K(\theta_d)$ |
| $w_{d=1...M, w=1...N_d}$ | $\text{Categorical}_V(\phi_{s_{d,w}})$ |

Inference

Learning the various distributions (the set of topics, their associated word probabilities, the topic of each word, and the particular topic mixture of each document) is a problem of Bayesian inference. The original paper used a variational Bayes approximation of the posterior distribution; alternative inference techniques use Gibbs sampling and expectation propagation.

Following is the derivation of the equations for collapsed Gibbs sampling, which means ϕs and θs will be integrated out. For simplicity, in this derivation the documents are all assumed to have the same length N. The derivation is equally valid if the document lengths vary.

According to the model, the total probability of the model is:

$$P(W, Z, \theta, \varphi, \alpha, \beta) = \prod_{i=1}^{K} P(\varphi_i; \beta) \prod_{j=1}^{M} P(\theta_j; \alpha) \prod_{t=1}^{N} P(Z_{j,t} | \theta_j) P(W_{j,t} | \varphi_{Z_{j,t}}),$$

where the bold-font variables denote the vector version of the variables. First of all, ϕ and θ is integrated out.

$$P(Z, W; \alpha, \beta) = \int_\theta \int_\varphi P(W, Z, \theta, \varphi; \alpha, \beta) d\varphi d\theta = \int_\varphi \prod_{i=1}^{K} P(\varphi_i; \beta) \prod_{j=1}^{M} \prod_{t=1}^{N} P(W_{j,t} | \varphi_{Z_{j,t}}) d\varphi \int_\theta \prod_{j=1}^{M} P(\theta_j; \alpha) \prod_{t=1}^{N} P(Z_{j,t} | \theta_j) d\theta.$$

All the θs are independent to each other and the same to all the ϕs. Each θ and each ϕ can be treated separately. Focus only on the θ part.

$$\int_\theta \prod_{j=1}^{M} P(\theta_j; \alpha) \prod_{t=1}^{N} P(Z_{j,t} | \theta_j) d\theta = \prod_{j=1}^{M} \int_{\theta_j} P(\theta_j; \alpha) \prod_{t=1}^{N} P(Z_{j,t} | \theta_j) d\theta_j.$$

Further focus on only one θ as the following:

$$\int_{\theta_j} P(\theta_j; \alpha) \prod_{t=1}^{N} P(Z_{j,t} | \theta_j) d\theta_j.$$

Actually, it is the hidden part of the model for the $j^{th}$ document. The probabilities in the above equation are replaced by the true distribution expression to write out the explicit equation.

$$\int_{\theta_j} P(\theta_j; \alpha) \prod_{t=1}^{N} P(Z_{j,t} | \theta_j) d\theta_j = \int_{\theta_j} \frac{\Gamma\left(\sum_{i=1}^{K} \alpha_i\right)}{\prod_{i=1}^{K} \Gamma(\alpha_i)} \prod_{i=1}^{K} \theta_{j,i}^{\alpha_i - 1} \prod_{t=1}^{N} P(Z_{j,t} | \theta_j) d\theta_j.$$

Let $n_{j,r}^i$ be the number of word tokens in the $j^{th}$ document with the same word symbol (the $r^{th}$ word in the vocabulary) assigned to the $i^{th}$ topic. So, $n_{j,r}^i$ is three dimensional. If any of the three dimensions is not limited to a specific value, a parenthesized point (•) is used to denote. For example, $n_{j,(\bullet)}^i$ denotes the number of word tokens in the $j^{th}$ document assigned to the $i^{th}$ topic. Thus, the right most part of the above equation can be rewritten as:

$$\prod_{t=1}^{N} P(Z_{j,t} | \theta_j) = \prod_{i=1}^{K} \theta_{j,i}^{n_{j,(\bullet)}^i}.$$

So the $\theta_j$ integration formula can be changed to:

$$\int_{\theta_j} \frac{\Gamma\left(\sum_{i=1}^{K} \alpha_i\right)}{\prod_{i=1}^{K} \Gamma(\alpha_i)} \prod_{i=1}^{K} \theta_{j,i}^{\alpha_i - 1} \prod_{i=1}^{K} \theta_{j,i}^{n_{j,(\bullet)}^i} d\theta_j = \int_{\theta_j} \frac{\Gamma\left(\sum_{i=1}^{K} \alpha_i\right)}{\prod_{i=1}^{K} \Gamma(\alpha_i)} \prod_{i=1}^{K} \theta_{j,i}^{n_{j,(\bullet)}^i + \alpha_i - 1} d\theta_j.$$

Clearly, the equation inside the integration has the same form as the Dirichlet distribution. According to the Dirichlet distribution, $$\int_{\theta_j} \frac{\Gamma\left(\sum_{i=1}^{K} n_{j,(\bullet)}^i + \alpha_i\right)}{\prod_{i=1}^{K} \Gamma(n_{j,(\bullet)}^i + \alpha_i)} \prod_{i=1}^{K} \theta_{j,i}^{n_{j,(\bullet)}^i + \alpha_i - 1} d\theta_j = 1.$$

Thus, $$\int_{\theta_j} P(\theta_j; \alpha) \prod_{t=1}^{N} P(Z_{j,t} | \theta_j) d\theta_j = \int_{\theta_j} \frac{\Gamma\left(\sum_{i=1}^{K} \alpha_i\right)}{\prod_{i=1}^{K} \Gamma(\alpha_i)} \prod_{i=1}^{K} \theta_{j,i}^{n_{j,(\cdot)}^i + \alpha_i - 1} d\theta_j =$$

$$\frac{\Gamma\left(\sum_{i=1}^{K} \alpha_i\right)}{\prod_{i=1}^{K} \Gamma(\alpha_i)} \frac{\prod_{i=1}^{K} \Gamma(n_{j,(\cdot)}^i + \alpha_i)}{\Gamma\left(\sum_{i=1}^{K} n_{j,(\cdot)}^i + \alpha_i\right)} \int_{\theta_j} \frac{\Gamma\left(\sum_{i=1}^{K} n_{j,(\cdot)}^i + \alpha_i\right)}{\prod_{i=1}^{K} \Gamma(n_{j,(\cdot)}^i + \alpha_i)} \prod_{i=1}^{K} \theta_{j,i}^{n_{j,(\cdot)}^i + \alpha_i - 1} d\theta_j =$$

$$\frac{\Gamma\left(\sum_{i=1}^{K} \alpha_i\right)}{\prod_{i=1}^{K} \Gamma(\alpha_i)} \frac{\prod_{i=1}^{K} \Gamma(n_{j,(\cdot)}^i + \alpha_i)}{\Gamma\left(\sum_{i=1}^{K} n_{j,(\cdot)}^i + \alpha_i\right)}.$$

Now look to the $\phi$ part. Actually, the derivation of the $\phi$ part is very similar to the $\theta$ part. Only the steps of the derivation are listed:

$$\int_{\varphi} \prod_{i=1}^{K} P(\varphi_i; \beta) \prod_{j=1}^{M} \sum_{t=1}^{N} P(W_{j,t} | \varphi z_{j,t}) d\varphi =$$

$$\prod_{i=1}^{K} \int_{\varphi_i} P(\varphi_i; \beta) \prod_{j=1}^{M} \sum_{t=1}^{N} P(W_{j,t} | \varphi z_{j,t}) d\varphi_i =$$

$$\prod_{i=1}^{K} \int_{\varphi_i} \frac{\Gamma\left(\sum_{r=1}^{V} \beta_r\right)}{\prod_{r=1}^{V} \Gamma(\beta_r)} \prod_{r=1}^{V} \varphi_{i,r}^{\beta_r - 1} \prod_{r=1}^{V} \varphi_{i,r}^{n_{(\cdot),r}^i} d\varphi_i =$$

$$\prod_{i=1}^{K} \int_{\varphi_i} \frac{\Gamma\left(\sum_{r=1}^{V} \beta_r\right)}{\prod_{r=1}^{V} \Gamma(\beta_r)} \prod_{r=1}^{V} \varphi_{i,r}^{n_{(\cdot),r}^i + \beta_r - 1} d\varphi_i =$$

$$\prod_{i=1}^{K} \frac{\Gamma\left(\sum_{r=1}^{V} \beta_r\right)}{\prod_{r=1}^{V} \Gamma(\beta_r)} \frac{\prod_{r=1}^{V} \Gamma(n_{(\cdot),r}^i + \beta_r)}{\Gamma\left(\sum_{r=1}^{V} n_{(\cdot),r}^i + \beta_r\right)}.$$

For clarity, here the final equation with both $\phi$ and $\theta$ integrated out:

$$P(Z, W; \alpha, \beta) =$$

$$\prod_{j=1}^{M} \frac{\Gamma\left(\sum_{i=1}^{K} \alpha_i\right)}{\prod_{i=1}^{K} \Gamma(\alpha_i)} \frac{\prod_{i=1}^{K} \Gamma(n_{j,(\cdot)}^i + \alpha_i)}{\Gamma\left(\sum_{i=1}^{K} n_{j,(\cdot)}^i + \alpha_i\right)} \times \prod_{i=1}^{K} \frac{\Gamma\left(\sum_{r=1}^{V} \beta_r\right)}{\prod_{r=1}^{V} \Gamma(\beta_r)} \frac{\prod_{r=1}^{V} \Gamma(n_{(\cdot),r}^i + \beta_r)}{\Gamma\left(\sum_{r=1}^{V} n_{(\cdot),r}^i + \beta_r\right)}.$$

The goal of Gibbs Sampling here is to approximate the distribution of $P(Z|W; \alpha, \beta)$. Since $P(W; \alpha, \beta)$ is invariable for any of Z, Gibbs Sampling equations can be derived from $P(Z, W; \alpha, \beta)$ directly. The key point is to derive the following conditional probability:

$$P(Z_{(m,n)} | Z_{-(m,n)}, W; \alpha, \beta) = \frac{P(Z_{(m,n)}, Z_{-(m,n)}, W; \alpha, \beta)}{P(Z_{-(m,n)}, W; \alpha, \beta)},$$

where $Z_{(m,n)}$ denotes the Z hidden variable of the $n^{th}$ word token in the $m^{th}$ document. And further assume that the word symbol of it is the $v^{th}$ word in the vocabulary. $Z_{-(m,n)}$ denotes all the Zs but $Z_{(m,n)}$. Note that Gibbs Sampling only samples a value for $Z_{(m,n)}$, according to the above probability, the exact value of $P(Z_{m,n}|Z_{-(m,n)}, W; \alpha, \beta)$ is not needed but the ratios among the probabilities that $Z_{(m,n)}$ can take value. So, the above equation can be simplified as:

$$P(Z_{(m,n)} = k | Z_{-(m,n)}, W; \alpha, \beta) \propto P(Z_{(m,n)} = k, Z_{-(m,n)}, W; \alpha, \beta) =$$

$$\left(\frac{\Gamma\left(\sum_{i=1}^{K} \alpha_i\right)}{\prod_{i=1}^{K} \Gamma(\alpha_i)}\right)^M$$

$$\prod_{j \neq m} \frac{\prod_{i=1}^{K} \Gamma(n_{j,(\cdot)}^i + \alpha_i)}{\Gamma\left(\sum_{i=1}^{K} n_{j,(\cdot)}^i + \alpha_i\right)} \times \left(\frac{\Gamma\left(\sum_{r=1}^{V} \beta_r\right)}{\prod_{i=1}^{V} \Gamma(\beta_r)}\right)^K \prod_{i=1}^{K} \prod_{r \neq v} \Gamma(n_{(\cdot),r}^i + \beta_r) \times$$

$$\frac{\prod_{i=1}^{K} \Gamma(n_{m,(\cdot)}^{(i)} + \alpha_i)}{\Gamma\left(\sum_{i=1}^{K} n_{m,(-)}^i + \alpha_i\right)} \prod_{i=1}^{K} \frac{\Gamma(n_{(\cdot),v}^i + \beta_v)}{\Gamma\left(\sum_{r=1}^{V} n_{(\cdot),r}^i + \beta_r\right)} \propto$$

$$\frac{\prod_{i=1}^{K} \Gamma(n_{m,(\cdot)}^{(i)} + \alpha_i)}{\Gamma\left(\sum_{i=1}^{K} n_{m,(-)}^i + \alpha_i\right)} \prod_{i=1}^{K} \frac{\Gamma(n_{(\cdot),v}^i + \beta_v)}{\Gamma\left(\sum_{r=1}^{V} n_{(\cdot),r}^i + \beta_r\right)}.$$

Finally, let $n_{j,r}^{i,-(m,n)}$ be the same meaning as $n_{j,r}^i$ but with the $Z_{(m,n)}$ excluded. The above equation can be further simplified by treating terms not dependent on k as constants:

$$\propto \frac{\prod_{i \neq k} \Gamma(n_{m,(\cdot)}^{i,-(m,n)} + \alpha_i)}{\Gamma\left(\left(\sum_{i=1}^{K} n_{m,(\cdot)}^{i,-(m,n)} + \alpha_i\right) + 1\right)} \prod_{i \neq \beta} \frac{\Gamma(n_{(\cdot),v}^{i,-(m,n)} + \beta_v)}{\Gamma\left(\sum_{r=1}^{V} n_{(\cdot),r}^{i,-(m,n)} + \beta_r\right)} \times$$

$$\Gamma(n_{m,(\cdot)}^{k,(m,n)} + \alpha_k - 1) \frac{\Gamma(n_{(\cdot),v}^{k,-(m,n)} - \beta_v + 1)}{\Gamma\left(\left(\sum_{r=1}^{V} n_{(\cdot),r}^{k,-(m,n)} + \beta_r\right) + 1\right)} \propto$$

$$\frac{\Gamma(n_{m,(\cdot)}^{k,-(m,n)} - \alpha_k + 1)}{\Gamma\left(\left(\sum_{i=1}^{K} n_{m,(\cdot)}^{i-(m,n)} + \alpha_i\right) + 1\right)} \frac{\Gamma(n_{(\cdot),v}^{k,-(m,n)} + \beta_v + 1)}{\Gamma\left(\left(\sum_{r=1}^{V} n_{(\cdot),i}^{k,-(m,n)} + \beta_r\right) + 1\right)} =$$

$$\frac{\Gamma(n_{m,(\cdot)}^{k,-(m,n)} + \alpha_k)(n_{m,(\cdot)}^{k,-(m,n)} + \alpha_k)}{\Gamma\left(\sum_{i=1}^{K} n_{m,(\cdot)}^{1,-(m,n)} + \alpha_1\right)\left(\sum_{i=1}^{K} n_{m,(\cdot)}^{1,-(m,n)} + \alpha_1\right)}$$

-continued $$\frac{\Gamma\left(n_{(\cdot),v}^{k,-(m,n)}+\beta_v\right)\left(n_{(\cdot),v}^{k,-(m,n)}+\beta_v\right)}{\Gamma\left(\sum_{r=1}^{V} n_{(\cdot),r}^{k,-(m,n)}+\beta_r\right)\left(\sum_{r=1}^{V} n_{(\cdot),r}^{k,-(m,n)}+\beta_r\right)} \propto$$

$$\frac{\left(n_{m,(\cdot)}^{k,-(m,n)} \mid \alpha_k\right)}{\left(\sum_{i=1}^{K} h_{m,(\cdot)}^{i,(m,n)}+\alpha_i\right)} \frac{\left(n_{(\cdot),v}^{k,-(m,n)} \mid \beta_v\right)}{\left(\sum_{r=1}^{V} n_{(\cdot),r}^{k,(m,n)}+\beta_r\right)} \propto \left(n_{m,(\cdot)}^{k,-(m,n)}+\alpha_k\right) \frac{\left(n_{(\cdot),v}^{k,-(m,n)}+\beta_r\right)}{\left(\sum_{r=1}^{V} n_{(\cdot),r}^{k,-(m,n)}+\beta_r\right)}.$$

Note that the same formula is derived in the article on the Dirichlet-multinomial distribution, as part of a more general discussion of integrating Dirichlet distribution priors out of a Bayesian network.

Applications, Extensions and Similar Techniques

Topic modeling is a classic problem in information retrieval. Related models and techniques are, among others, latent semantic indexing, independent component analysis, probabilistic latent semantic indexing, non-negative matrix factorization, and Gamma-Poisson distribution.

The LDA model is highly modular and can therefore be easily extended. The main field of interest is modeling relations between topics. This is achieved by using another distribution on the simplex instead of the Dirichlet. The Correlated Topic Model follows this approach, inducing a correlation structure between topics by using the logistic normal distribution instead of the Dirichlet. Another extension is the hierarchical LDA (hLDA), where topics are joined together in a hierarchy by using the nested Chinese restaurant process. LDA can also be extended to a corpus in which a document includes two types of information (e.g., words and names), as in the LDA-dual model. Supervised versions of LDA include L-LDA, which has been found to perform better than SVM under certain conditions. Non-parametric extensions of LDA include the Hierarchical Dirichlet process mixture model, which allows the number of topics to be unbounded and learned from data and the Nested Chinese Restaurant Process which allows topics to be arranged in a hierarchy whose structure is learnt from data.

As noted earlier, PLSA is similar to LDA. The LDA model is essentially the Bayesian version of PLSA model. The Bayesian formulation tends to perform better on small datasets because Bayesian methods can avoid overfitting the data. In a very large dataset, the results are probably the same. One difference is that PLSA uses a variable d to represent a document in the training set. So in PLSA, when presented with a document the model hasn't seen before $Pr(w|z)$—the probability of words under topics—to be that learned from the training set is fixed and the same EM algorithm is used to infer $Pr(z|d)$—the topic distribution under d. Blei argues that this step is cheating because you are essentially refitting the model to the new data.

Variations on LDA have been used to automatically put natural images into categories, such as "bedroom" or "forest", by treating an image as a document, and small patches of the image as words; one of the variations is called Spatial Latent Dirichlet Allocation.

Thus, embodiments of the invention are disclosed. One skilled in the art will appreciate that the present invention can be practiced with embodiments other than those disclosed. The disclosed embodiments are presented for purposes of illustration and not limitation.

What is claimed is:

1. A device implemented method for automatically generating content from a plurality of web sites into original content, comprising the steps of:
    searching a plurality of web sites on the internet using a predetermined key word to create a subset of said plurality of web sites having web content related to said predetermined keyword;
    creating a corpus by separating said web content into a plurality of sentences, each of said plurality of sentences having a plurality of words;
    filtering said plurality of sentences from said corpus for suitability of use in automatically generating said generated content by an analysis of at least one of (1) sentence grammar, (2) sentence form, (3) sentence punctuation, (4) sentence length, and (5) said plurality of words;
    determining a topic, separately for each of said plurality of sentences using a topic model creating a plurality of topics;
    ranking each of said plurality of topics based upon a determination of uniqueness keeping a portion of said plurality of sentences with said topic having a relatively higher ranking and discarding those of said plurality of sentences with said topic having a relatively lower ranking;
    instantiating a new sentence by taking a first portion of a first one of said plurality of topics combined with a second portion of a second one of said plurality of topics; and
    repeating said instantiating step taking a different portion of a different one of said plurality of topics combined with another portion of said still another one of said plurality of topics until a number of new sentences are formed.

2. The method of claim 1 further comprising the step of selecting said first portion of said first one of said plurality of sentences and selecting said second portion of said second one of said plurality of sentences in said instantiating step by comparing said first one of said plurality of sentences with other sentences in said corpus; and
    picking said first one of said plurality of sentences based on a higher degree of relationship between said first one of said plurality of sentences and said second one of said plurality of sentences; and
    repeating said selecting step and said picking step for each said new sentence in a paragraph.

3. The method of claim 1 wherein said instantiating step is accomplished by:
    first identifying noun phrases in said plurality of sentences of said corpus;
    second identifying verb phrases in said plurality of sentences of said corpus;
    compiling a list of possible noun phrase—noun phrase pairs and verb phrase—verb phrase pairs by iterating through each of said noun phrases and said verb phrases of said plurality of sentences of said corpus;
    first replacing a noun phrase in one of said plurality of sentences with its corresponding noun phrase from a noun phrase—noun phrase pair determined in said compiling step and second replacing a verb phrase in one of said plurality of sentences with its corresponding verb phrase from each verb phrase—verb phrase pair determined in said compiling step creating said new sentence.

4. The method of claim 1 wherein said creating step stores only a portion of said web content as said corpus.

5. The method of claim 1 wherein said creating step eliminates formatting and graphics.

6. The method of claim 1 wherein said filtering step excludes portions of said corpus which includes a personal reference to the author.

7. The method of claim 1 wherein said filtering step excludes portions of said corpus which contains a reference to an antecedent including but not limited to "this" and "there".

8. The method of claim 1 wherein said determining step is accomplished without regard to how each of plurality of sentences may relate to other of said plurality of sentences.

9. The method of claim 8 wherein said topic model used in said determining step comprises a latent dirichlet allocation topic model.

10. The method of claim 1 wherein said filtering step comprises filtering said plurality of sentences from said corpus for suitability of use in automatically generating said generated content by an analysis of sentence grammar.

11. The method of claim 10 wherein said filtering step comprises selecting only ones of said plurality of sentences having both a noun and a verb.

12. The method of claim 1 wherein said filtering step comprises filtering said plurality of sentences from said corpus for suitability of use in automatically generating said generated content by an analysis of sentence form.

13. The method of claim 12 wherein said filtering step comprises selecting only ones of said plurality of sentences that contain less than a predetermined number of capitalized words.

14. The method of claim 13 wherein said filtering step comprises selecting only ones of said plurality of sentences that contain fewer than eleven capitalized words.

15. The method of claim 1 wherein said filtering step comprises filtering said plurality of sentences from said corpus for suitability of use in automatically generating said generated content by an analysis of sentence punctuation.

16. The method of claim 15 wherein said filtering step comprises selecting only ones of said plurality of sentences without a comma within a predetermined number of characters of a start of said ones of said plurality of sentences.

17. The method of claim 16 wherein said filtering step comprises selecting only ones of said plurality of sentences without a comma within a first twenty characters.

18. The method of claim 1 wherein said filtering step comprises filtering said plurality of sentences from said corpus for suitability of use in automatically generating said generated content by an analysis of sentence length.

19. The method of claim 18 wherein said filtering step comprises selecting only ones of said plurality of sentences containing a predetermined range of length.

20. The method of claim 19 wherein said filtering step comprises selecting only ones of said plurality of sentences ranging from ten to thirty words in length.

21. The method of claim 1 wherein said filtering step comprises filtering said plurality of sentences from said corpus for suitability of use in automatically generating said generated content by an analysis of said plurality of words.

22. The method of claim 21 wherein said filtering step selects only ones of said plurality of sentences that does not contain a predetermined list of prohibited strings of words.

23. The method of claim 22 wherein said predetermined list of strings of words comprises a reference to another textual location.

24. The method of claim 22 wherein said filtering step selects only ones of said plurality of sentences that does not contain a time of day.

25. The method of claim 21 wherein said filtering step selects only ones of said plurality of sentences containing less than six numerical digits.

26. A machine readable storage medium storing executable program instructions which when executed cause a data processing system to perform a method for automatically generating content from a plurality of web sites into original content, comprising the steps of:
 searching a plurality of web sites on the internet using a predetermined key word to create a subset of said plurality of web sites having web content related to said predetermined keyword;
 creating a corpus by separating said web content into a plurality of sentences, each of said plurality of sentences having a plurality of words;
 filtering said plurality of sentences from said corpus for suitability of use in automatically generating said generated content by an analysis of at least one of (1) sentence grammar, (2) sentence form, (3) sentence punctuation, (4) sentence length, and (5) said plurality of words;
 determining a topic, separately for each of said plurality of sentences using a topic model creating a plurality of topics;
 ranking each of said plurality of topics based upon a determination of uniqueness keeping a portion of said plurality of sentences with said topic having a relatively higher ranking and discarding those of said plurality of sentences with said topic having a relatively lower ranking;
 instantiating a new sentence by taking a first portion of a first one of said plurality of topics combined with a second portion of a second one of said plurality of topics; and
 repeating said instantiating step taking a different portion of a different one of said plurality of topics combined with another portion of said still another one of said plurality of topics until a number of new sentences are formed.

* * * * *